(12) United States Patent
Zhang et al.

(10) Patent No.: US 11,178,709 B2
(45) Date of Patent: Nov. 16, 2021

(54) PAIRING METHOD, DEVICE, MACHINE-READABLE STORAGE MEDIUM, AND SYSTEM

(71) Applicant: SZ DJI TECHNOLOGY CO., LTD., Shenzhen (CN)

(72) Inventors: Zhipeng Zhang, Shenzhen (CN); Xiaojun Yin, Shenzhen (CN); Naibo Wang, Shenzhen (CN); Ning Ma, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 32 days.

(21) Appl. No.: 16/576,423

(22) Filed: Sep. 19, 2019

(65) Prior Publication Data

US 2020/0015301 A1   Jan. 9, 2020

Related U.S. Application Data (63) Continuation of application No. PCT/CN2017/078758, filed on Mar. 30, 2017.

(51) Int. Cl.
*H04W 76/14* (2018.01)
*H04W 12/03* (2021.01)
*H04W 12/0471* (2021.01)

(52) U.S. Cl.
CPC .......... *H04W 76/14* (2018.02); *H04W 12/03* (2021.01); *H04W 12/0471* (2021.01)

(58) Field of Classification Search
CPC .................................................. H04W 76/14
See application file for complete search history.

(56) References Cited

U.S. PATENT DOCUMENTS

| | | | |
|---|---|---|---|
| 8,879,994 B2 * | 11/2014 | Brown | G06K 9/0004 455/41.3 |
| 9,241,270 B1 * | 1/2016 | Logue | G06F 21/44 |
| 2004/0030887 A1 | 2/2004 | Harrisville-Wolff et al. | |

(Continued)

FOREIGN PATENT DOCUMENTS

| CN | 102064858 A | 5/2011 |
|---|---|---|
| CN | 104104414 A | 10/2014 |

(Continued)

OTHER PUBLICATIONS

"Bluetooth Security Protocol Analysis and Improvements" San Jose State University, Chi Shing Lee, May 2006. (Year: 2006).*

(Continued)

*Primary Examiner* — Ivan O Latorre
*Assistant Examiner* — Won Tae C Kim
(74) *Attorney, Agent, or Firm* — Anova Law Group, PLLC (57) ABSTRACT

A pairing method implemented in a first device includes obtaining identification information of a second device. The pairing method also includes transmitting a pairing request message to the second device, the pairing request message carrying a system key. The pairing method also includes receiving a pairing response message from the second device. The pairing method also includes analyzing the pairing response message based on the system key. The pairing method further includes verifying the analyzed pairing response message based on the identification information.

14 Claims, 8 Drawing Sheets

(56) References Cited

U.S. PATENT DOCUMENTS

| | | | |
|---|---|---|---|
| 2006/0083187 A1* | 4/2006 | Dekel | ............... H04L 63/0853 |
| | | | 370/310 |
| 2011/0072263 A1 | 3/2011 | Bishop et al. | |
| 2015/0089222 A1* | 3/2015 | White | ................. H04L 9/3249 |
| | | | 713/168 |
| 2015/0372754 A1 | 12/2015 | Choi et al. | |

FOREIGN PATENT DOCUMENTS

| | | |
|---|---|---|
| CN | 104798432 A | 7/2015 |
| CN | 105142237 A | 12/2015 |
| CN | 105933742 A | 9/2016 |
| CN | 106131103 A | 11/2016 |

OTHER PUBLICATIONS

The World Intellectual Property Organization (WIPO) International Search Report for PCT/CN2017/078758 dated Jan. 8, 2018 7 pages.

* cited by examiner

PAIRING METHOD, DEVICE, MACHINE-READABLE STORAGE MEDIUM, AND SYSTEM

CROSS-REFERENCE TO RELATED APPLICATION

This application is a continuation application of International Application No. PCT/CN2017/078758, filed on Mar. 30, 2017, the entire content of which is incorporated herein by reference.

TECHNICAL FIELD

The present disclosure relates to the technology field of unmanned aerial vehicles ("UAVs") and, more particularly, to a pairing method, device, machine-readable storage medium, and system.

BACKGROUND

UAVs are unmanned aircrafts that are controlled by a control device. UAVs have wide applications, and are often used for city management, agriculture, geology, weather, power, rescue, video recording and photography, etc.

Currently, a UAV may be controlled by a control device. However, to control the UAV, first, the control device and the UAV need to be paired. In current technology, typically the following method is used for completing the pairing between the UAV and the control device: a user adjusts the control device to a communication channel dedicated for pairing, and adjusts the UAV to the same communication channel as the control device, such that the control device and the UAV are in the pairing state.

Then, the user operates buttons such that the control device broadcast a pairing request. After the UAV receives the pairing request, the UAV returns a pairing confirmation message to the control device. After the control device receives the pairing confirmation message, the pairing is successful, and the control device and the UAV can have normal communication.

However, in the above method, when multiple control devices and/or multiple UAVs enter the pairing state simultaneously, the communication settings of the control devices and the UAVs tend to overlap, resulting in interference between the communication channels, which leads to erroneous pairing, affecting the success rate of pairing. Furthermore, a third-party control device may transmit a pairing request to the UAV to maliciously hijack the UAV, causing security issues.

SUMMARY

In accordance with an aspect of the present disclosure, there is provided a pairing method implemented in a first device. The pairing method includes obtaining identification information of a second device. The pairing method also includes transmitting a pairing request message to the second device, the pairing request message carrying a system key. The pairing method also includes receiving a pairing response message from the second device. The pairing method also includes analyzing the pairing response message based on the system key. The pairing method further includes verifying the analyzed pairing response message based on the identification information.

In accordance with another aspect of the present disclosure, there is provided a pairing device as a first device. The pairing device includes an imaging device configured to capture an image comprising identification information of a second device. The pairing device also includes a processor configured to obtain the identification information of the second device based on the image. The pairing device also includes a transmitter configured to transmit a pairing request message to the second device, the pairing request message carrying a system key. The pairing device further includes a receiver configured to receive a pairing response message from the second device. The processor is configured to analyze the pairing response message based on the system key and verify the analyzed pairing response message based on the identification information.

In accordance with another aspect of the present disclosure, there is provided a pairing device as a second device. The pairing device includes a processor configured to obtain identification information of the second device. The pairing device also includes a receiver configured to receive a pairing request message from a first device, the pairing request message carrying a system key. The pairing device further includes a transmitter configured to transmit a pairing response message to the first device based on the pairing request message.

According to the technical solutions of the present disclosure, in the embodiments of the present disclosure, a first device (e.g., a UAV or a control device) may obtain identification information of a second device (e.g., a control device or a UAV), and may complete the pairing of the first device and the second based on the identification information. Because only the first device and the second device that need to be paired can complete the pairing based on the identification information, the pairing result is accurate, which can overcome the issue of incorrect pairing due to multiple first devices and/or multiple second devices in a pairing region entering the pairing state simultaneously. In addition, the identification information may be used to encrypt the exchanged content between the first device and the second device. Because a third-party device cannot obtain the identification information, the third-party device cannot decrypt the exchanged content between the first device and the second device. Therefore, the third-party device cannot interfere the pairing process of the first device and the second device, thereby protecting the security of the devices to the maximum extent, and avoiding having potential security issues.

BRIEF DESCRIPTION OF THE DRAWINGS

To better describe the technical solutions of the various embodiments of the present disclosure, the accompanying drawings showing the various embodiments will be briefly described. As a person of ordinary skill in the art would appreciate, the drawings show only some embodiments of the present disclosure. Without departing from the scope of the present disclosure, those having ordinary skills in the art could derive other embodiments and drawings based on the disclosed drawings without inventive efforts.

DETAILED DESCRIPTION OF THE EMBODIMENTS

Technical solutions of the present disclosure will be described in detail with reference to the drawings. It will be appreciated that the described embodiments represent some, rather than all, of the embodiments of the present disclosure. Other embodiments conceived or derived by those having ordinary skills in the art based on the described embodiments without inventive efforts should fall within the scope of the present disclosure.

The terms used in the present disclosure are only for the purpose of describing specific embodiments, and are not for limiting the present disclosure. The singular forms "a," "an," and "the" are intended to include the plural forms as well, unless the context indicates otherwise. The term "and/or" used herein includes any suitable combination of one or more related items listed.

Although the present disclosure may use terms such as "first," "second," "third," etc., to describe various information, the information is not limited by these terms. The terms are only used to separate the information of the same type. For example, without departing from the scope of the present disclosure, the first information may also be referred to as the second information. Similarly, the second information may be referred to as the first information. Depending on the context, the term "if" may be interpreted as "when," or "as," or "in response to."

The term "and/or" used herein includes any suitable combination of one or more related items listed. For example, A and/or B can mean A only, A and B, and B only. The symbol "/" means "or" between the related items separated by the symbol. The phrase "at least one of" A, B, or C encompasses all combinations of A, B, and C, such as A only, B only, C only, A and B, B and C, A and C, and A, B, and C. In this regard, A and/or B can mean at least one of A or B. The term "communicatively couple(d)" or "communicatively connect(ed)" indicates that related items are coupled or connected through a communication channel, such as a wired or wireless communication channel. The term "unit," "sub-unit," or "module" may encompass a hardware component, a software component, or a combination thereof. For example, a "unit," "sub-unit," or "module" may include a processor, a portion of a processor, an algorithm, a portion of an algorithm, a circuit, a portion of a circuit, etc.

Further, when an embodiment illustrated in a drawing shows a single element, it is understood that the embodiment may include a plurality of such elements. Likewise, when an embodiment illustrated in a drawing shows a plurality of such elements, it is understood that the embodiment may include only one such element. The number of elements illustrated in the drawing is for illustration purposes only, and should not be construed as limiting the scope of the embodiment. Moreover, unless otherwise noted, the embodiments shown in the drawings are not mutually exclusive, and they may be combined in any suitable manner. For example, elements shown in one embodiment but not another embodiment may nevertheless be included in the other embodiment.

The present disclosure provides a pairing method. The method may be implemented in a system including a first device and a second device, for completing pairing of the first device and the second device. The first device may be an unmanned aerial vehicle ("UAV"), the second device may be a control device. In some embodiments, the first device may be a control device, the second device may be a UAV. The control device may be a remote controller or glasses. The control device may be other types, such as a wristband, an armband, etc. The present disclosure does not limit the type of the control device.

Figure 1A:
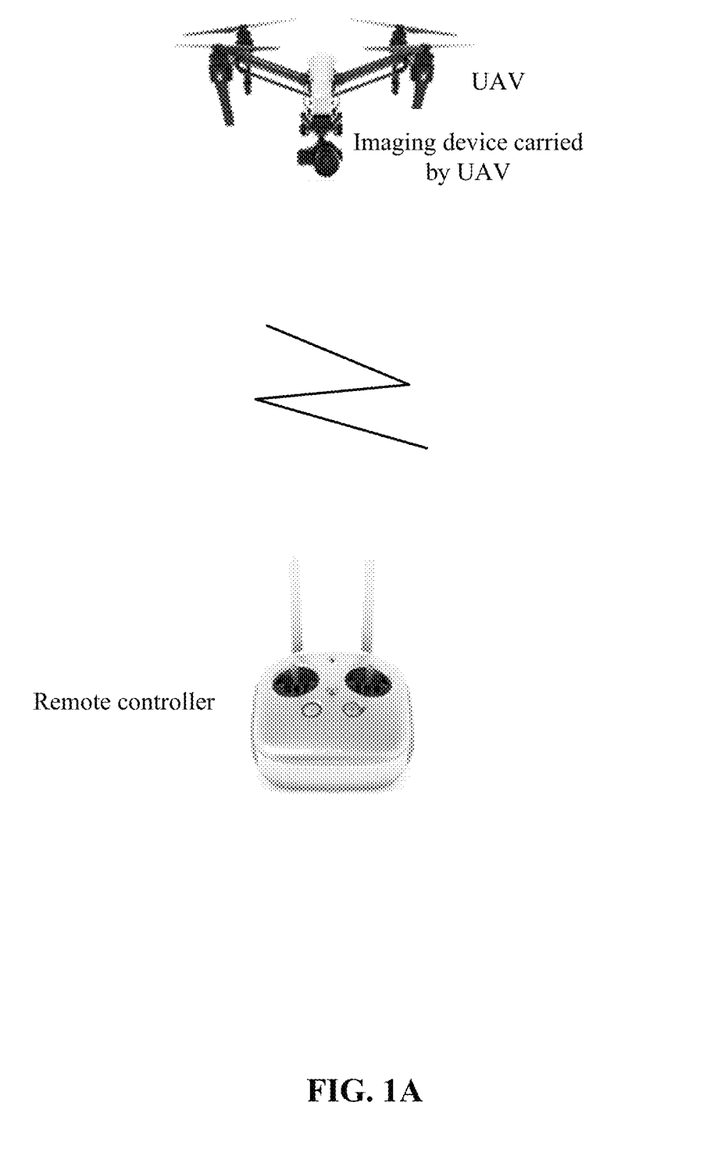
FIG. 1A and FIG. 1B are schematic application scenes, according to example embodiments.
Figure 1B:
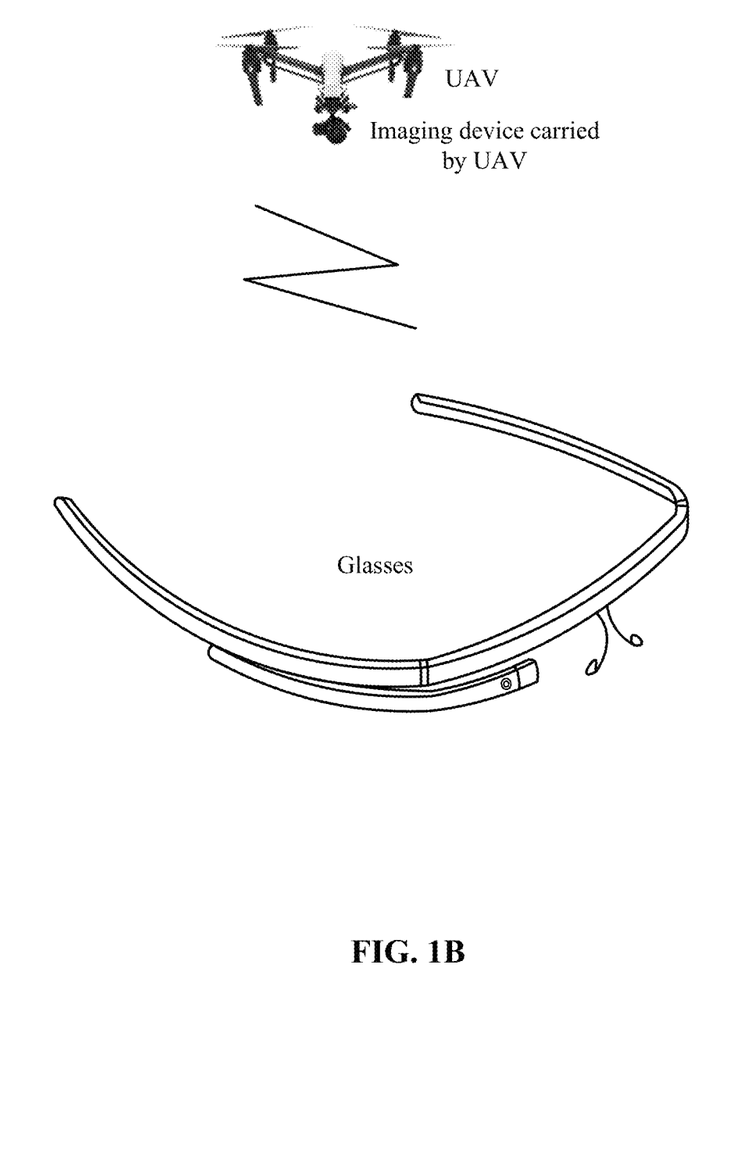

FIG. 1A shows a remote controller as an example of the control device. The pairing method may be used for completing pairing between the UAV and the remote controller. FIG. 1B shows glasses as an example of the control device. The pairing method may be used to complete pairing between the UAV and the glasses. In FIG. 1A and FIG. 1B, the UAV may be provided with an imaging device.

Next, the present embodiments are explained with reference to the application scenes of FIG. 1A and FIG. 1B.

Figure 2A:
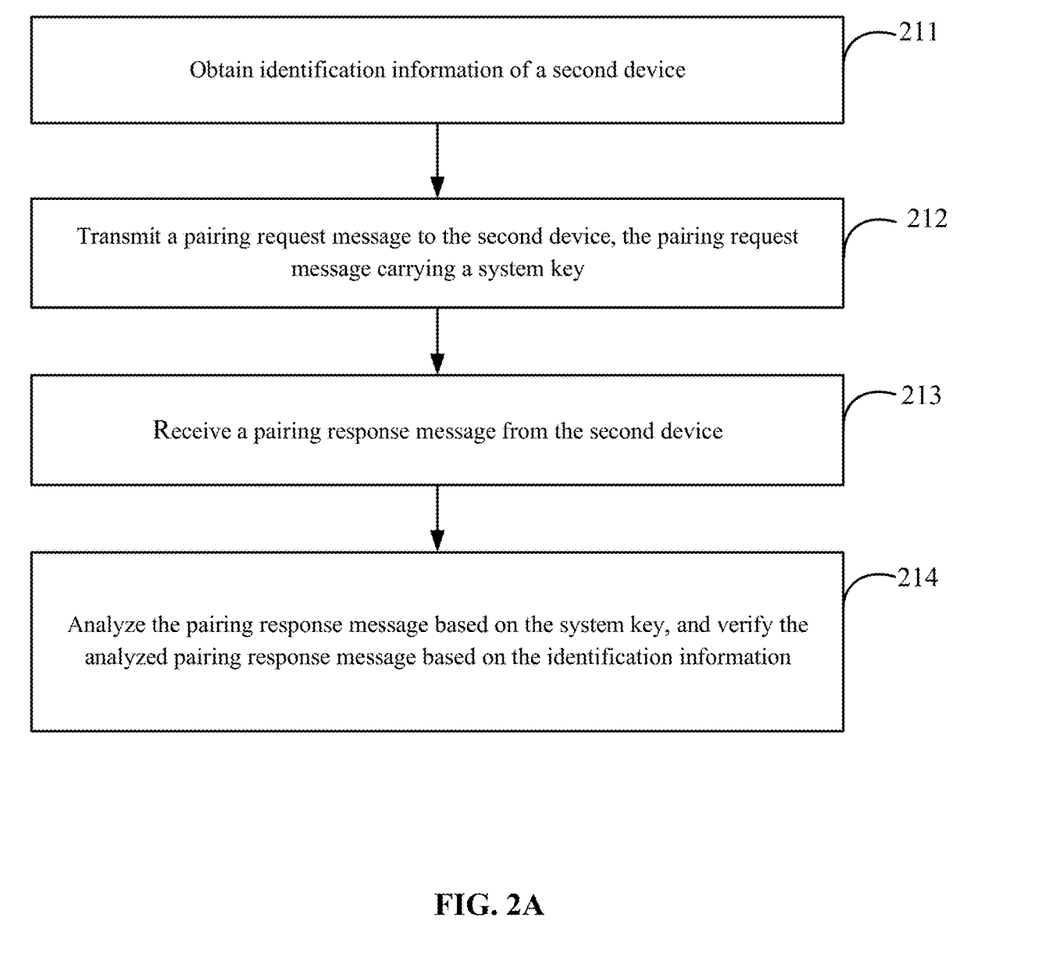
FIG. 2A and FIG. 2B are flow charts illustrating pairing methods, according to example embodiments.

FIG. 2A is a flow chart illustrating a pairing method. The method may be implemented in the first device.

Step 211: obtaining identification information of a second device.

In an example, the identification information may include, but not be limited to: fixed identification information attached to a surface of the second device (i.e., the identification does not change during each pairing process); or variable identification information displayed in a display zone of the second device (i.e., the identification information may change during each pairing process; of course, the identification information may not change for each pairing process). Further, the fixed identification information may include, but not be limited to: a barcode or a quick response ("QR") code.

As shown in FIG. 1A, when the first device is a UAV, the second device is a remote controller, in an example, the identification information may be a bar code or a QR code attached to the surface of the remote controller. The uniqueness of the bar code or the QR code has been determined when the remote controller is manufactured. The UAV may scan the bar code or the QR code attached to the surface of the remote controller through the imaging device provided on the UAV to retrieve the identification information of the remote controller, such as 111010101011000. Alternatively, in another example, the identification information may be variable identification information displayed in a display zone (e.g., a display screen) of the remote controller. Through the remote controller or a terminal device connected with the remote controller, new identification information may be generated for each pairing, or the identification information used in last pairing may be used. The UAV may scan the display zone of the remote controller through the imaging device to retrieve the identification information of the remote controller, such as 12156325412202, etc.

As shown in FIG. 1B, when the first device is a UAV, the second device is glasses, in an example, the identification information may be a bar code or a QR code attached to the surface of the glasses. The uniqueness of the bar code or the QR code has been determined when the glasses are manufactured. The UAV may scan the bar code or the QR code attached to the surface of the glasses through the imaging device provided on the UAV to retrieve the identification information of the glasses. Alternatively, in another example, the identification information may be variable identification information displayed in a display zone (e.g., a display screen) of the glasses. Through the glasses or a terminal device connected with the glasses, new identification information may be generated for each pairing, or the identification information used in last pairing may be used.

The UAV may scan the display zone of the glasses using the imaging device to read the identification information of the glasses.

In an example, the identification information may include pairing identification information and pairing confirmation information. The first device may analyze the identification information to obtain pairing identification information and pairing confirmation information of the second device. In some embodiments, the pairing identification information may be obtained from analyzing a first specified location of the identification information, and the pairing confirmation information may be obtained from analyzing a second specified location in the identification information.

The first specified location may be the first M1 positions, and the second specified location may be the last N1 positions; alternatively, the first specified location may be the last M2 positions, and the second specified location may be the first N2 positions; alternatively, the first specified location may be an odd position, and the second specified location may be an even position; alternatively, the first specified location may be an even position, and the second specified location may be an odd position. These are only examples of the first specified location and the second specified location. The action implementation is not limited to these examples. Thus, the locations are not limited by the present disclosure.

For example, the identification information may be a 64-bit binary number. Between the first device and the second device, the first specified location may be defined as the first 32 bits, and the second specified location may be defined as the last 32 bits. Based on this definition, after the first device obtains the identification information, the first device may determine the first 32 bits of the identification information to be the pairing identification information, and determine the last 32 bits of the identification information to be the pairing confirmation information.

In an example, the above pairing identification information may also include a check code. After the first device obtains the identification information and analyze the identification information to obtain the pairing identification information, the first device may verify the pairing identification information based on the check code. If the verification is successful, it may indicate that the pairing identification information has not been tampered, and subsequent steps may be executed. If the verification fails, it may indicate that pairing identification information has been tampered. The obtained identification information may be discarded, and the process may re-execute step 211.

Step 212: transmitting a pairing request message to the second device, the pairing request message carrying a system key.

In another example, the first device may randomly generate a system key, and then generate a pairing request message carrying the system key. In another example, the first device may randomly generate a system key, and obtain first device information (e.g., information regarding the unique identification of the first device, physical resources, etc.), and then generate the pairing request message carrying the system key and the first device information.

In an example, regarding the process of "transmitting a pairing request message to the second device," it may include, but not be limited to: encrypting the pairing request message based on the pairing identification information, and transmitting the encrypted pairing request message to the second device. Further, after the second device receives the pairing request message, the second device may determine that the pairing with the first device is successful based on the system key carried by the pairing request message.

Regarding the process of "encrypting the pairing request message based on the identification information," the first device may treat the pairing identification information and the pairing request message as content to be encrypted, and encrypt the pairing identification information and the pairing request message based on a predetermined algorithm. The predetermined algorithm may be configured based on actual needs, as long as the same algorithm is configured at the first device and the second device. The first device may use the predetermined algorithm for encryption, and the second device may use the predetermined algorithm for decryption after receiving the encrypted message.

For example, the predetermined algorithm may include, but not be limited to: Data Encryption Standard ("DES"), Rivet Shamir Adelman ("RSA"), Advanced Encryption Standard ("AES"), etc. The present disclosure does not limit the type of the predetermined algorithm.

Step 213: receiving a pairing response message from the second device.

The pairing response message may be a pairing response message transmitted by the second device and corresponding to the pairing request message. The pairing response message may be encrypted based on the system key, and may include the pairing confirmation information.

Step 214: analyzing the pairing response message based on the system key, and verifying the analyzed pairing response message based on the identification information (e.g., the identification information obtained in step 211).

In an example, regarding the process of "verifying the analyzed pairing response message based on the identification information" may include: verifying the analyzed pairing response message based on the pairing confirmation information included in the identification information. In some embodiments, the analyzed pairing response message may include the pairing confirmation information.

In an example, after the second device receives the pairing request message carrying the system key, the second device may decrypt the pairing request message to obtain the system key, and determine that the pairing with the first device is successful based on the system key. The second device may then return a pairing response message corresponding the pairing request message to the first device. The pairing response message may carry the pairing confirmation information, and may be encrypted based on the system key. The processing of the second device will be introduced in detail in the following embodiments, which is not repeated here.

After the first device receives the pairing response message from the second device, the first device may decrypt the pairing response message based on the system key. If the pairing response message carries pairing confirmation information, then, after the pairing response message is decrypted, the pairing confirmation information may be obtained. Further, if the pairing confirmation information carried by the pairing response message and the pairing confirmation information included in the identification information (e.g., the identification information obtained in step 211) match with one another, it may be determined that the pairing between the first device and the second device is successful.

Regarding the process of "decrypting the pairing response message based on the system key," the first device may treat the system key and the pairing response message as content to be decrypted, and may decrypt the system key and the pairing response message based on a predetermined algorithm (e.g., the algorithm in step 212).

In an example, if after the pairing request message is transmitted to the second device, a pairing response message is not received from the second device within a predetermined time, then it may be determined that the pairing between the first device and the second device has failed. Alternatively, if when verifying the analyzed pairing response message based on the identification information, it is determined that the pairing response message is invalid (i.e., the pairing confirmation information carried by the pairing response message does not match the pairing confirmation information of the identification information), it may be determined that the pairing between the first device and the second device has failed.

In some embodiments, assuming that the second device that receives the pairing request message is not a device that needs to pair with the first device, then the second device cannot successfully decrypt the pairing request message, and will not return a pairing response message to the first device. As such, when the first device does not receive the pairing response message within a predetermined time, it may be determined that the pairing has failed. Alternatively, even when the second device cannot successfully decrypt the pairing request message, the second device may nonetheless return a pairing response message to the first device. However, because the second device cannot obtain the correct pairing confirmation information, the pairing response message does not carry the correct pairing confirmation information. AS such, after the first device receives the pairing response message within the predetermined time, because the pairing confirmation information carried by the pairing response message does not match the previously obtained pairing confirmation information, it may be determined that the pairing has failed.

Based on the above technical solutions, in the present disclosure, the first device (e.g., a UAV or a control device) may first obtain the identification information of the second device (e.g., the control device or the UAV), and may complete the pairing between the first device and the second device based on the identification information. Because only the first device and the second device that mutually need to pair with one another can complete the pairing based on the identification information, the pairing result is accurate. The disclosed technical solution overcomes the issue of incorrect pairing when multiple first devices and/or multiple second devices in a pairing region simultaneously enter the pairing state. Further, the exchanged content between the two parties may be encrypted based on the identification information. Because the third-party device cannot obtain the identification information, the exchanged content between the first device and the second device cannot be decrypted, and therefore, cannot interfere with the pairing process between the first device and the second device, thereby significantly increases the security of the devices, avoiding potential security issues.

Figure 2B:
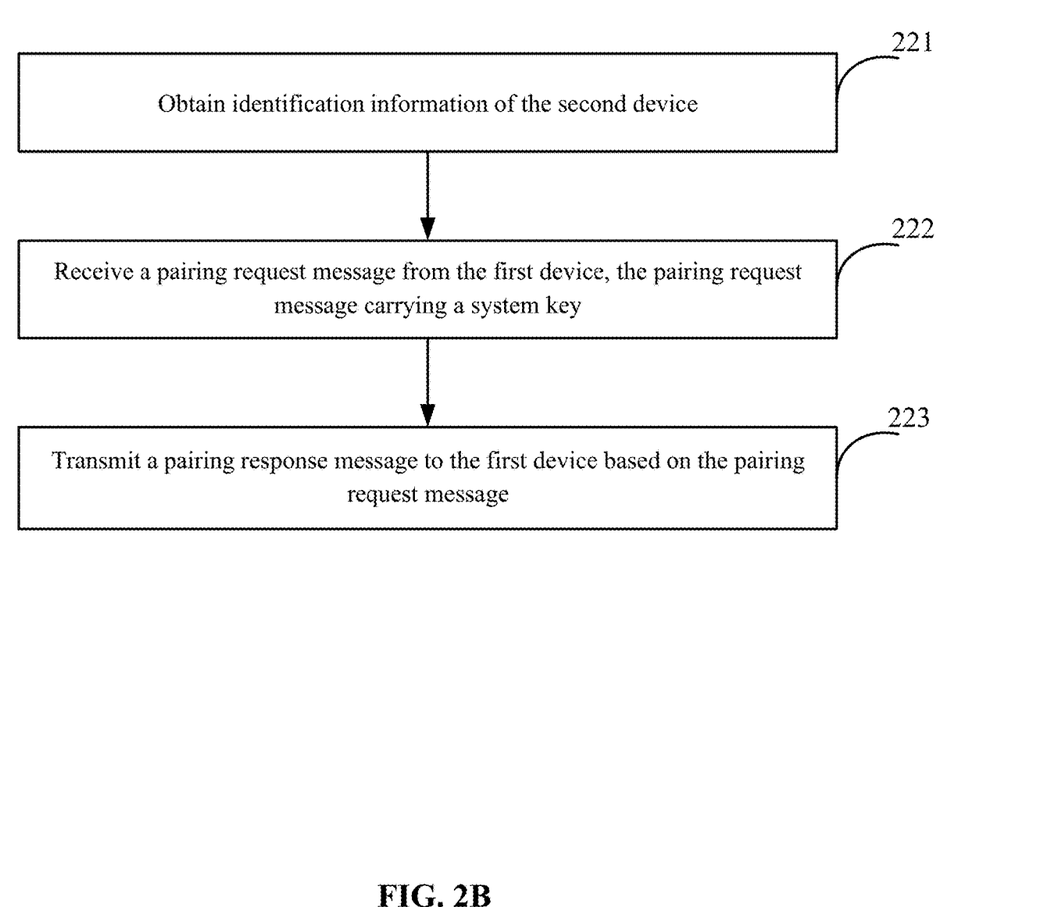

FIG. 2B is a flow chart illustrating a pairing method. The method may be implemented in the second device.

Step 221: obtaining identification information of the second device.

In an example, the identification information may include, but not be limited to: fixed identification information attached to the surface of the second device (i.e., in each pairing process, the identification information does not change); alternatively, variable identification information may be displayed in a display zone of the second device (i.e., during each pairing process, the identification information may change; of course, the identification information does not necessarily need to be changed for each pairing process). Further, the fixed identification information may include, but not be limited to: a bar code or a QR code.

As shown in FIG. 1A, when the first device is a UAV, the second device is a remote controller, in an example, the identification information may be a bar code or a QR code attached to the surface of the remote controller. The uniqueness of the bar code or the QR code has been determined when the remote controller is manufactured. Further, the identification information corresponding to the bar code or the QR code may be pre-disposed inside the remote controller. As such, the remote controller may directly obtain the identification information, such as 111010101011000. Alternatively, in another example, the identification information may be variable identification information displayed in a display zone (e.g., a display screen) of the remote controller. Through the remote controller or a terminal device connected with the remote controller, new identification information may be generated at each pairing, or the identification information used in the last pairing may be used. If the remote controller generates the identification information, the remote controller itself may directly obtain the identification information. If the terminal device generates the identification information, the remote controller may obtain the identification information from the terminal device.

As shown in FIG. 1B, when the first device is a UAV, the second device is glasses, in an example, the identification information may be a bar code or a QR code attached to the surface of the glasses. The uniqueness of the bar code or the QR code has been determined when the glasses are manufactured. Further, the identification information corresponding to the bar code or the QR code may be pre-disposed inside the glasses. As such the glasses may obtain the identification information. Alternatively, in another example, the identification information may be variable identification information displayed in a display zone of the glasses. Through the glasses or the terminal device connected with the glasses, new identification information may be generated at each pairing, or the identification information used in last pairing may be used. If the glasses generate the identification information, the glasses may obtain the identification information. If the terminal device generates the identification information, the glasses may obtain the identification information from the terminal device.

In an example, the identification information may include pairing identification information and pairing confirmation information. The first device may analyze the identification information to obtain the pairing identification information and the pairing confirmation information of the second device. Specifically, the pairing identification information may be obtained from analyzing a first specified location of the identification information, and the pairing confirmation information may be obtained from analyzing a second specified location of the identification information.

In some embodiments, the first specified location may be the first M1 positions, and the second specified location may be the last N1 positions; alternatively, the first specified location may be the last M2 positions, and the second specified location may be the first N2 positions; alternatively, the first specified location may be an odd position, the second specified location may be an even position; alternatively, the first specified location may be an even position, and the second specified location may be an odd position. These are examples of the first specified location and the second specified location. Actual implementations are not limited to these examples. The present disclosure does not limit the locations.

Step 222: receiving a pairing request message from the first device, the pairing request message carrying a system key.

In an example, the pairing request message transmitted by the first device may be encrypted with the pairing identification information (e.g., the pairing identification information obtained by the first device). As such, in the process of receiving the pairing request message from the first device, the pairing request message may be decrypted based on the pairing identification information (e.g., the pairing identification information obtained by the second device), to obtain the system key, and determine that the pairing between the second device and the first device is successful.

Regarding the process of "decrypting the pairing request message based on the pairing identification information," the second device may treat the pairing identification information and the pairing request message as the content to be decrypted, and decrypt the pairing identification information and the pairing request message based on a predetermined algorithm. The predetermined algorithm may eb the same as the predetermined algorithm configured at the first device. Descriptions of the algorithm can refer to step 212, which are not repeated.

In an example, if the pairing request message carries only the system key, then, after decrypting the pairing request message based on the pairing identification information, the second device may obtain the system key from the decrypted pairing request message. In another example, if the pairing request message carries the system key and the first device information, then, after decrypting the pairing request message based on the pairing identification information, the second device may obtain the system key and the first device information from the decrypted pairing request message.

Step 223: transmitting a pairing response message to the first device based on the pairing request message. The pairing response message is encrypted with the system key, and the pairing response message including pairing confirmation information. Then, the first device may determine that the pairing with the second device is successful based on the pairing confirmation information carried by the pairing response message.

In an example, the second device may generate a pairing response message carrying pairing confirmation information, and encrypt the pairing response message using the system key. Regarding the process of "encrypting the pairing response message using the system key," the second device may treat the system key and the pairing response message as the content to be encrypted, and encrypt the system key and the pairing response message based on a predetermined algorithm.

Regarding the processes shown in FIG. 2A and FIG. 2B, after the second device obtains the identification information, the second device may transmit a pairing creation message to the first device. The pairing creation message may be encrypted with the pairing identification information. The first device may receive the pairing creation message from the second device. Because the pairing creation message is encrypted with the pairing identification information, the pairing creation message may be verified based on the identification information. For example, the pairing creation message may be decrypted based on the pairing identification information included in the identification information. The encryption method and decryption method used here may be similar to the encryption method and the decryption method used in the above processes, which are not repeated.

In some embodiments, the pairing creation message transmitted by the second device to the first device may carry second device information (e.g., information such as the unique identification information of the second device, the physical resources, etc.). After the first device verifies the pairing creation message based on the identification information, the first device may obtain the second device information from the pairing creation message.

In some embodiments, after the second device transmits the pairing creation message to the first device, if the second device does not receive a pairing request message carrying the system key transmitted by the first device within a predetermined time (i.e., does not receive the pairing request message of step 222), it may be determined that the pairing between the second device and the first device has failed.

In summary, during the pairing process between the first device and the second device, exchange of device information may be completed (e.g., the first device provides first device information to the second device, and the second device provides second device information to the first device). Exchange of the system key may also be completed (e.g., the first device randomly generates a system key and provides the system key to the second device). As such, after successfully pairing the first device and the second device, dialogue processing may be performed using the device information and the system key exchanged in the pairing process.

In some embodiments, after the first device and the second device are successfully paired, the first device may transmit a dialogue message to the second device based on the second device information and the system key. The second device may receive the dialogue message transmitted by the first device, and may decrypt the dialogue message based on the system key, and process the decrypted dialogue message. In addition, the second device may transmit a dialogue message to the first device based on the first device information and the system key. The first device may receive the dialogue message transmitted by the second device, and decrypt the dialogue message based on the system key, and perform subsequent processes based on the decrypted dialogue message.

Based on the above technical solutions, in the present embodiment, the first device (e.g., a UAV or a control device) may obtain identification information of the second device (e.g., the control device or the UAV), and complete pairing between the first device and the second device based on the identification information. Because only the first device and the second device that need to be paired with one another can complete the pairing based on the identification information, the pairing result is accurate. The disclosed technical solution can avoid the issues relating to incorrect pairing when multiple first devices and/or multiple second devices in a pairing zone simultaneously enter the pairing state. Further, the exchanged content between the two parties may be encrypted based on the identification information. Because a third-party device cannot obtain the identification information, the third-party device cannot decrypt the exchanged content between the first device and the second device, and therefore, cannot interfere with the pairing process between the first device and the second device. As a result, the security of the devices is significantly improved, avoiding any potential security issues.

Figure 3:
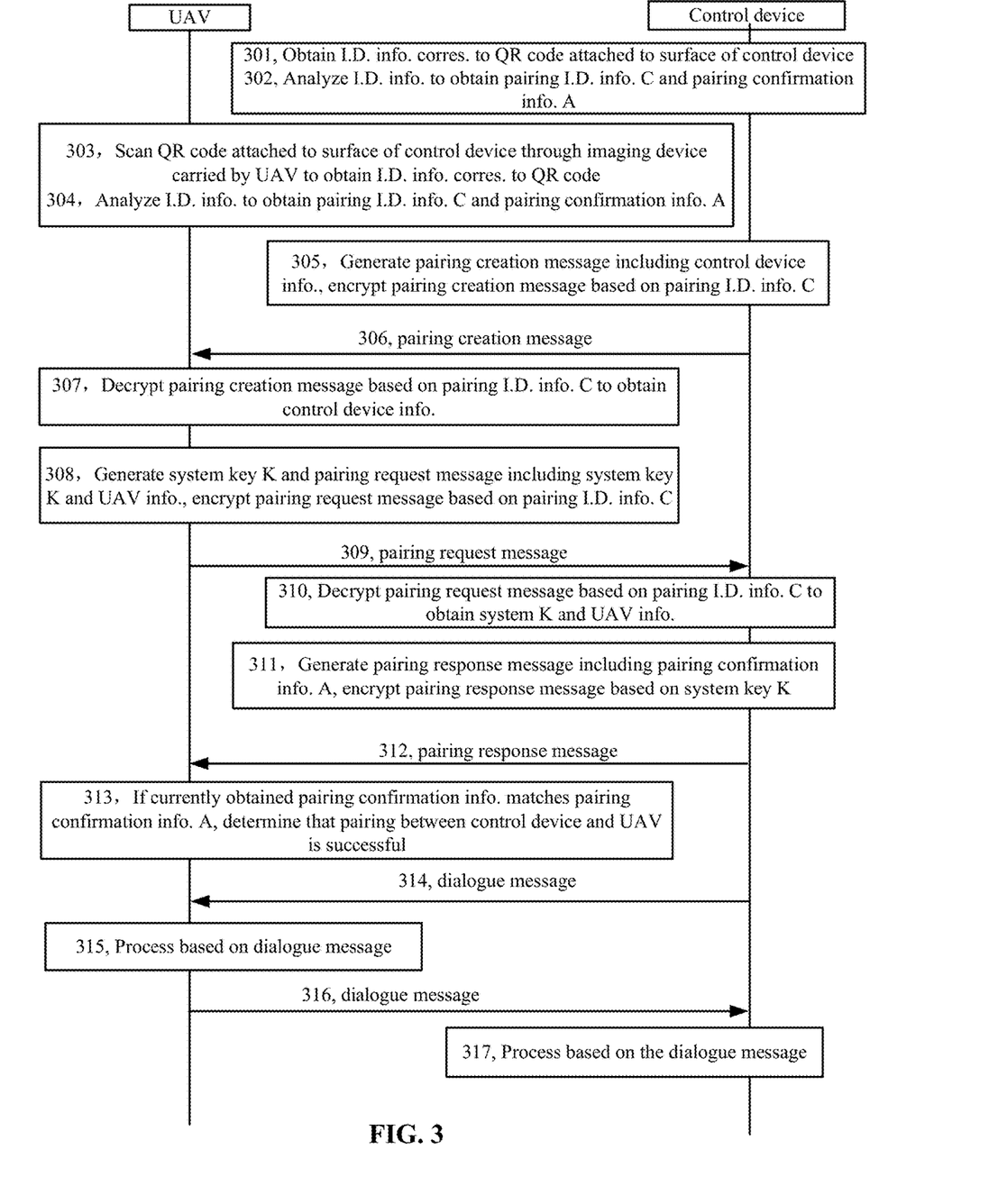
FIG. 3 is a flow chart illustrating a pairing method, according to another example embodiment.

FIG. 3 is a flow chart illustration a pairing method. In this process, a UAV is the first device, a control device is the second device. The control device may be a remote controller or glasses. In addition, as an example, a QR code is attached to the surface of the control device. The QR code corresponds to or contains identification information.

Steps 301-302, after the control device triggers the pairing, the control device obtains identification information ("I.D. info." in drawings) corresponding to the QR code attached to the surface of the control device. The control device may analyze the identification information to obtain pairing identification information (referred to as pairing identification information C hereinafter) and pairing confirmation information (referred to as pairing confirmation information A hereinafter).

Steps 303-304, after the UAV triggers the pairing by a pairing button, the UAV scans the QR code attached to the surface of the control device by an imaging device carried by the UAV to obtain the identification information corresponding to the QR code. The UAV may analyze the identification information to obtain the pairing identification information C and the pairing confirmation information A.

Step 305: the control device generates a pairing creation message including control device information (e.g., identification of the control device, physical resources, etc.), and encrypts the pairing creation message based on the pairing identification information C.

Step 306: the control device transmits the encrypted pairing creation message to the UAV.

In an example, the control device may periodically transmit the pairing creation message on a wireless channel. As such, the UAV may receive the pairing creation message transmitted by the control device on the wireless channel.

Step 307: after the UAV receives the pairing creation message transmitted by the control device, the UAV encrypts the pairing creation message based on previously obtained pairing identification information C to obtain the control device information.

Step 308: the UAV randomly generates a system key (referred to as system key K hereinafter, for example), and generates a pairing request message including the system key K and the UAV information (e.g., information such as the identification of the UAV, physical resources, etc.), and encrypts the pairing request message based on the pairing identification information C.

Step 309: the UAV transmits the encrypted pairing request message to the control device.

Step 310: after the control device receives the pairing request message, the control device decrypts the pairing request message based on the pairing identification information C to obtain the system K and the UAV information.

Until this step, the control device has obtained the system key K and the UAV information, and may determine that the pairing between the control device and the UAV is successful. In the subsequent dialogue stage, the system key K and the UAV information may be used.

Step 311: the control device generates a pairing response message corresponding to the pairing request message, which includes the pairing confirmation information A, and encrypts the pairing response message based on the system key K.

Step 312: the control device transmits the encrypted pairing response message to the UAV.

In an example, the control device may periodically transmit the pairing response message within a time window T. When the time window T has lapsed, the control device stops transmitting the pairing response message, and exits the pairing state.

Step 313: if the UAV does not receive the pairing response message within the time window T, the UAV may determine that the pairing between the control device and the UAV has failed. If the UAV receives the pairing response message within the time window T, the pairing response message may be decrypted based on the system key K to obtain the pairing confirmation information. If the currently obtained pairing confirmation information matches the previously obtained pairing confirmation information A from analyzing the identification information, it may be determined that the pairing between the control device and the UAV is successful. If the currently obtained pairing confirmation information does not match the pairing confirmation message A previously obtained from analyzing the identification information, it may be determined that the pairing between the control device and the UAV has failed.

If the pairing between the control device and the UAV is successful, because the control device information and the system key K have been obtained, in subsequent dialogue stage, the UAV may use the system key K and the control device information. If the pairing between the control device and the UAV has failed, various methods, such as flashing a light or a buzzer may be used to notify the user that the pairing has failed, thereby triggering re-pairing between the control device and the UAV. The processes are not repeated.

Steps 314-315: the control device transmits a dialogue message to the UAV based on the UAV information and the system key K. The UAV receives the dialogue message, and performs processing based on the dialogue message.

Steps 316-317: the UAV transmits a dialogue message to the control device based on the control device information and the system key K. The control device receives the dialogue message, and performs processing of the dialogue message.

Figure 4:
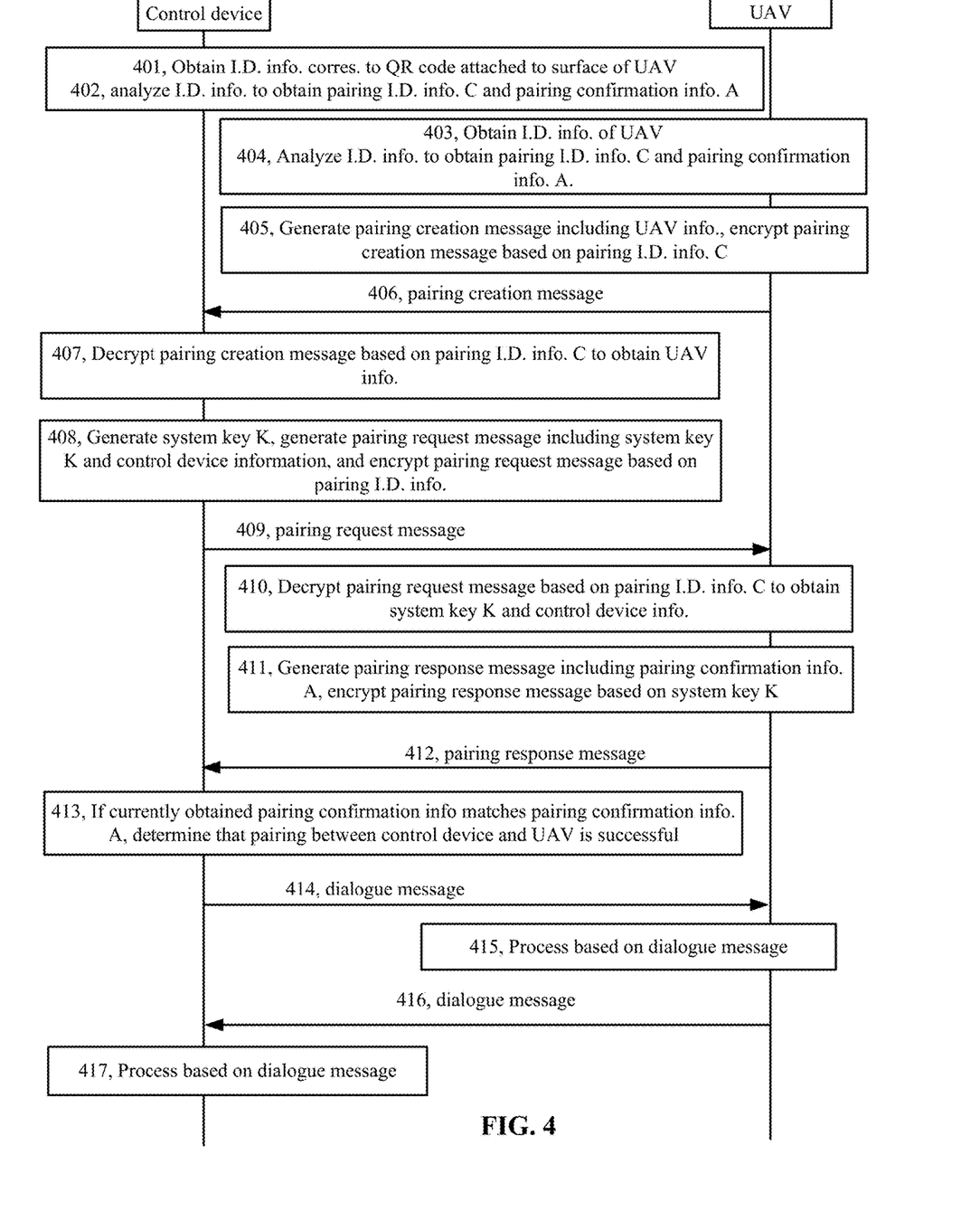
FIG. 4 is a flow chart illustrating a pairing method, according to another example embodiment.

FIG. 4 is a flow chart illustrating a pairing method. In this process, the UAV is the second device, and the control device is the first device. The control device may be a remote controller or glasses. In addition, a QR code may be attached to the surface of the control device (or the UAV). The QR code may correspond to identification information.

Steps 401-402: after the control device triggers the pairing, obtaining the identification information corresponding to the QR code attached to the surface of the UAV. The control device may analyze the identification information to obtain pairing identification information (referred to as pairing identification information C hereinafter) and pairing confirmation information (referred to as pairing confirmation information A hereinafter).

In an example, if the control device is glasses, the glasses may include an imaging device. The imaging device may scan the QR code attached to the surface of the UAV to obtain the identification information corresponding to the QR code.

If the control device is a remote controller, the remote controller may be provided with an imaging device. The imaging device may scan the QR code attached to the surface of the UAV, to obtain the identification information corresponding to the QR code. Alternatively, the remote controller may not be provided with an imaging device. Instead, a terminal device (e.g., a smart phone, a tablet, etc.) connected with the remote controller may be provided with an imaging device. As such, the terminal device may scan the QR code attached to the surface of the UAV through the imaging device to obtain the identification information corresponding to the QR code, and providing the identification information to the remote controller.

Steps 403-404: after triggering the pairing through the pairing button, the UAV obtains the identification information of the UAV, and analyzes the identification information to obtain the pairing identification information C and the pairing confirmation information A.

Step 405: the UAV generates a pairing creation message including UAV information (such as the identification of the UAV, physical resources, etc.), and encrypts the pairing creation information based on the pairing identification information C.

Step 406: the UAV transmits the encrypted pairing creation information to the control device.

Step 407: after the control device receives the pairing creation message transmitted by the UAV, the control device decrypts the pairing creation message based on previously obtained pairing identification information C to obtain the UAV information.

Step 408: the control device randomly generates a system key (also referred to as system key K hereinafter), generates a pairing request message including the system key K and control device information (such as the identification of the control device, physical resources, etc.), and encrypts the pairing request message based on the pairing identification information C.

Step 409: the control device transmits the encrypted pairing request message to the UAV.

Step 410: after receiving the pairing request message, the UAV decrypts the pairing request message based on the pairing identification information C to obtain the system key K and the control device information.

Until this step, the UAV has obtained the system key K and the control device information, and can determine that the pairing between the control device and the UAV is successful. In subsequent dialogue stage, the UAV may use the system key K and the control device information.

Step 411: the UAV generates a pairing response message corresponding to the pairing request message, which includes pairing confirmation information A, and encrypts the pairing response message based on the system key K.

Step 412: the UAV transmits the encrypted pairing response message to the control device.

In an example, the UAV may periodically transmit the pairing response message within the time window T. After the time window T has lapsed, the UAV may stop transmitting the pairing response message, and then may exit the pairing state.

Step 413: if the control device does not receive the pairing response message within the time window T, it may be determined that the pairing between the control device and the UAV has failed. If the control device receives the pairing response message within the time window T, the pairing response message may be decrypted based on the system key K to obtain the pairing confirmation information. If the currently obtained pairing confirmation information matches the previously obtained pairing confirmation information A from analyzing the identification information, it may be determined that the pairing between the control device and the UAV is successful. If the currently obtained pairing confirmation information does not match the previously obtained pairing confirmation information A from analyzing the identification information, it may be determined that the pairing between the control device and the UAV has failed.

If the pairing between the control device and the UAV is successful, because the UAV information and the system key K have been obtained, in subsequent dialogue stage, the control device may use the system key K and the UAV information. If the pairing between the control device and the UAV has failed, the user may be notified that the pairing has failed, and re-pairing may be triggered.

Steps 414-415: the control device transmits a dialogue message to the UAV based on the UAV information and the system key K. The UAV receives the dialogue message, and performs processing based on the dialogue message.

Steps 416-417: the UAV transmits a dialogue message to the control device based on the control device information and the system key K. The control device receives the dialogue message, and performs processing based on the dialogue message.

Figure 5:
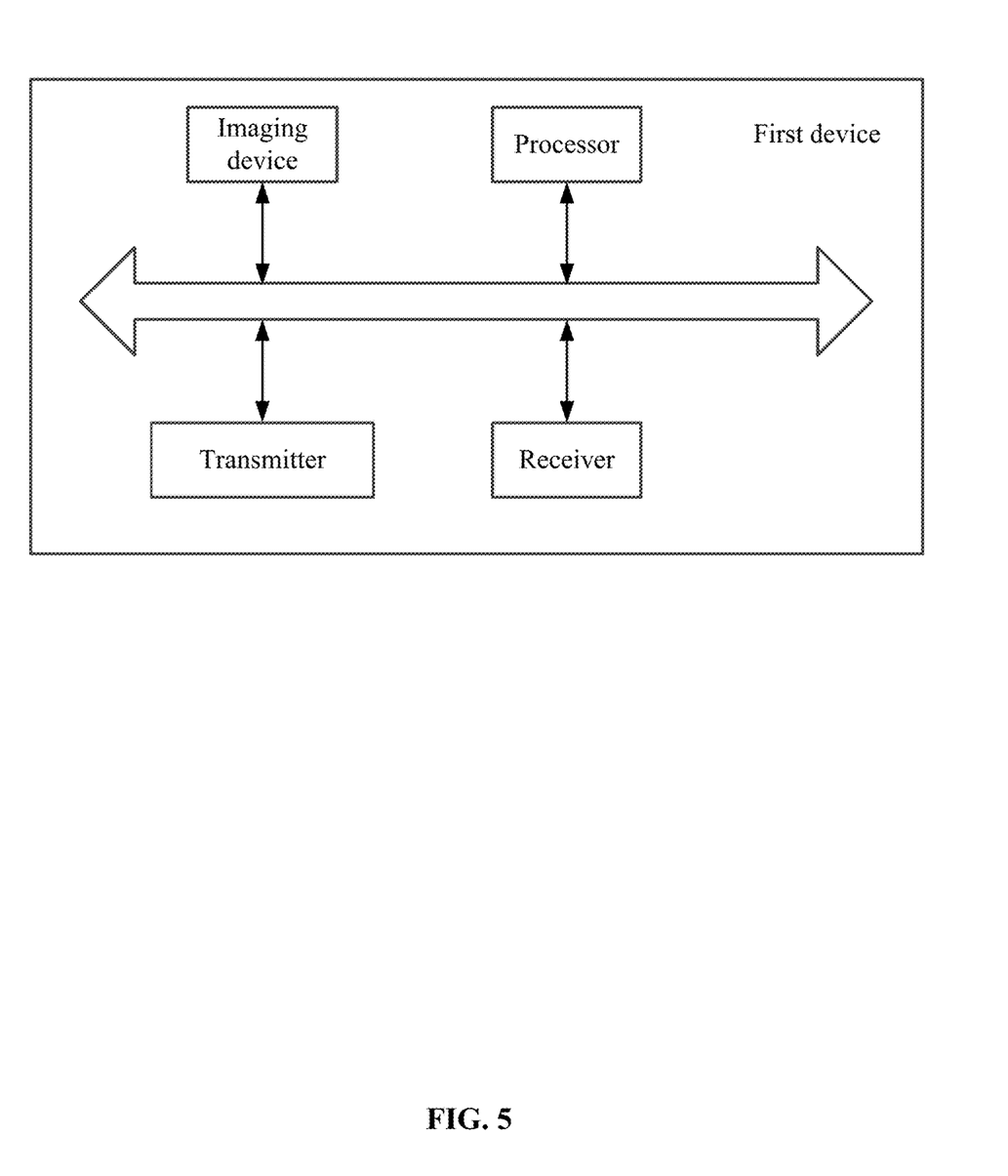
FIG. 5 is a schematic diagram of a first device, according to an example embodiment.

Based on an inventive concept similar to that described above in connection with the disclosed method, the present disclosure also provides a pairing device. The pairing device may be the first device (e.g., the UAV or the control device). As shown in FIG. 5, the pairing device may include: an imaging device, a processor, a transmitter, or a receiver, or a combination thereof. The imaging device may be configured to acquire an image including identification information of the second device. The processor may be configured to obtain the identification of the second device based on the image. The transmitter may be configured to transmit a pairing request message to the second device, the pairing request message carrying a system key. The receiver may be configured to receive a pairing response message from the second device. The processor may be configured to analyze the pairing response information based on the system key, and verify the analyzed pairing response information based on the identification information.

In an example, the identification information includes pairing identification information. The processor may be configured to, while the pairing request message is being transmitted to the second device, encrypt the pairing request message based on the pairing identification information. The transmitter may be configured to transmit the encrypted pairing request message to the second device.

In an example, the identification information may include pairing identification information. The receiver may be configured to receive a pairing creation message from the second device, the pairing creation message being encrypted with the pairing identification information. The processor may be configured to verify the pairing creation message based on the identification information.

In an example, the identification information may include pairing confirmation information. The pairing response message may be encrypted with the system key. The processor may be configured to, during the process of verifying the analyzed pairing response message based on the identification information, verify the analyzed pairing response message based on the pairing confirmation information. The analyzed pairing response message includes the pairing confirmation information.

In an example, the identification information may include pairing identification information and pairing confirmation information. The processor may obtain the pairing identification information from analyzing a first specified location of the identification information, and obtain the pairing confirmation information from analyzing a second specified location of the identification information.

In an example, the first device is the UAV, and the second device is the control device. Alternatively, the first device is the control device, and the second device is the UAV.

Figure 6:
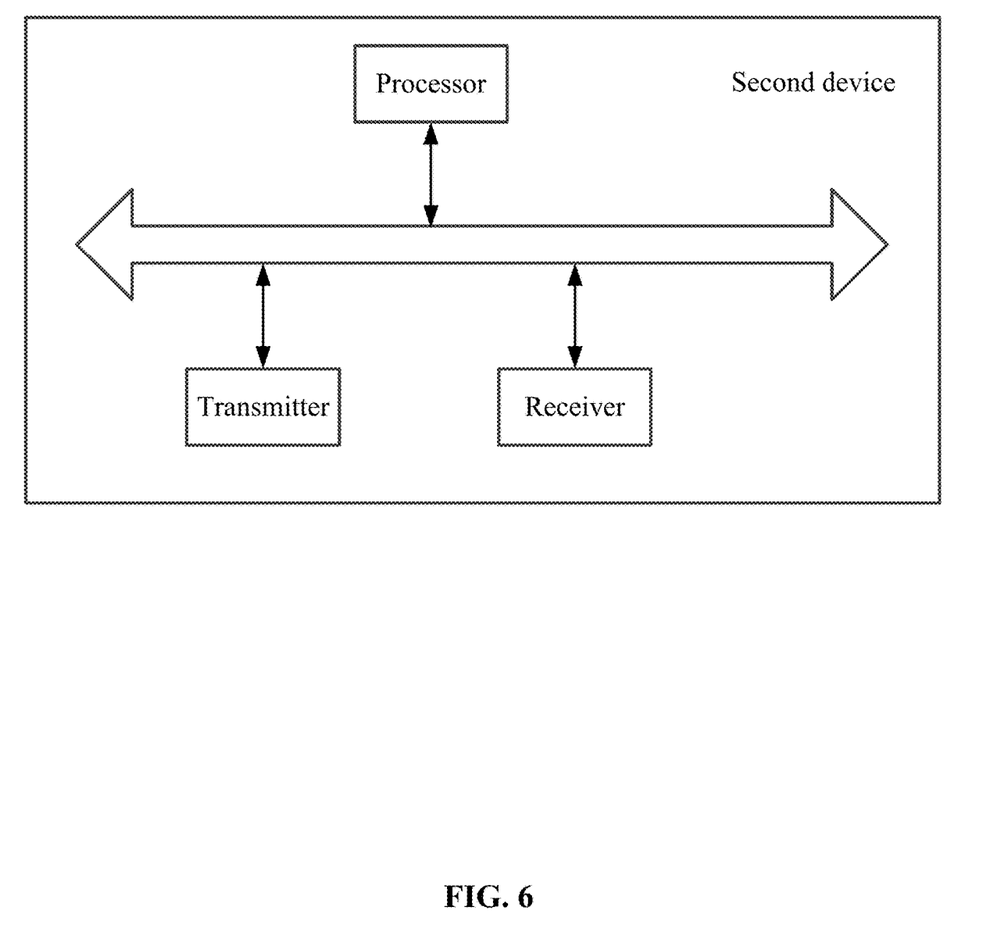
FIG. 6 is a schematic diagram of a second device, according to an example embodiment.

The present disclosure also provides a pairing device. The pairing device may be the second device (e.g., when the first device is the UAV, the second is the control device; or, when the first device is the control device, the second device is the UAV). As shown in FIG. 6, the pairing device may include:

a processor, a receiver, or a transmitter, or a combination thereof. The processor may be configured to obtain the identification information of the second device. The receiver may be configured to receive the pairing request message from the first device. The pairing request message may carry the system key. The transmitter may be configured to transmit the pairing response message to the first device based on the pairing request message.

The identification information may include the pairing identification information. The transmitter may be configured to transmit the pairing creation message to the first device. The pairing creation message may be encrypted with the pairing identification information.

In another example, the identification information may include the pairing identification information. The receiver may be configured to, during a process of receiving the pairing request message from the first device, decrypt the pairing request message based on the pairing identification information to obtain the system key.

In an example, the pairing response message transmitted by the transmitter to the first device may be encrypted based on the system key. The identification information may include pairing confirmation information. The pairing response message transmitted by the transmitter to the first device may include pairing confirmation information.

In an example, the identification information may include pairing identification information and pairing confirmation information. The processor may be configured to obtain the pairing identification information from analyzing the first specified location of the identification information, and obtain the pairing confirmation information from analyzing the second specified location of the identification information.

In an example, the first device is the UAV, and the second device is the control device. Alternatively, the first device is the control device, and the second device is the UAV.

Based on an inventive concept similar to that of the disclosed method, the present disclosure also provides a machine-readable storage medium. The machine-readable storage medium may be located in the first device (e.g., the UAV or the control device). The machine-readable storage medium may store a plurality of computer instructions. When executed by a processor, the computer instructions may cause the processor to perform the following operations: obtaining the identification information of the second device; transmitting the pairing request message to the second device, the pairing request message carrying the system key; receiving the pairing response message from the second device; analyzing the pairing response message based on the system key; and verifying the analyzed pairing response message based on the identification information.

The identification information may include pairing identification information. During the process of transmitting the pairing request message to the second device, the computer instructions may be executed by the processor to cause the processor to perform the following operations: encrypting the pairing request message based on the pairing identification information; and transmitting the encrypted pairing request message to the second device.

The identification information may include the pairing identification information. The computer instructions may be executed by the processor to cause the processor to perform the following operations: receiving a pairing creation message from the second device, the pairing creation message being encrypted based on the pairing identification information; and verifying the pairing creation message based on the identification information.

The identification information may include pairing confirmation information. The pairing response message may be encrypted based on the system key. During the process of verifying the analyzed pairing response message based on the identification information, the computer instructions may be executed by the processor to cause the processor to perform the following operations: verifying the analyzed pairing response message based on the pairing confirmation information. The analyzed pairing response message may include the pairing confirmation information.

The identification information may include the pairing identification information and the pairing confirmation information. The computer instructions may be executed by the processor to cause the processor to perform the following operations: obtaining the pairing identification information from analyzing a first specified location of the identification information; and obtaining the pairing confirmation information from analyzing a second specified location of the identification information.

Based on an inventive concept similar to that of the disclosed method, the present disclosure provides a machine-readable storage medium. The machine-readable storage medium may be located in the second device (e.g., when the first device is the UAV, the second device is the control device; alternatively, when the first device is the control device, the second device is the UAV). The machine-readable storage medium may store a plurality of computer instructions. When executed by a processor, the computer instructions may cause the processor to perform the following operations: obtaining identification information of the second device; receiving a pairing request message from the first device, the pairing request message carrying a system key; and transmitting a pairing response message to the first device based on the pairing request message.

The identification information may include pairing identification information. When executed by a processor, the computer instructions may cause the processor to perform the following operations: transmitting a pairing creation message to the first device, the pairing creation message being encrypted based on the pairing identification information.

The identification information may include pairing identification information. During a process of the first device receiving the pairing request message, the computer instructions may be executed by a processor to cause the processor to perform the following operations: decrypting the pairing request message based on the pairing identification information to obtain the system key.

The identification information may include pairing identification information and pairing confirmation information. When executed by a processor, the computer instructions may cause the processor to perform the following operations: obtaining the pairing identification information from analyzing the first specified location of the identification information; and obtaining the pairing confirmation information from analyzing the second specified location of the identification information.

Based on the inventive concept similar to that of the above disclosed method, the present disclosure also provides a pairing system. The pairing system may include a first device and a second device.

The first device may be configured to obtain identification information of the second device, transmit a pairing request message to the second device, the pairing request message carrying a system key; receive a pairing response message from the second device; analyze the pairing response message based on the system key; and verify the analyzed pairing response message based on the identification information.

The second device may be configured to obtain the identification information of the second device; receive the pairing request message from the first device, the pairing request message carrying a system key; and transmit the pairing response message to the first device based on the pairing request message.

In an example, the first device is the UAV, the second device is the control device; or the first device is the control device, and the second device is the UAV.

The system, device, module, or unit of the above embodiments may be realized through a computer chip or a physical entity, or may be realized through a product having certain functions. A typical realization device may be a computer. The computer may be a personal computer, a laptop computer, a cellular phone, a camera phone, a smart phone, a personal digital assistant, a media player, a navigation device, an e-mail receiving and transmitting device, a game console, a tablet computer, a wearable device, or any combination thereof.

For the convenience of description, when describing the above devices, various units divided by their functions are described. When implementing the present disclosure, the functions of the various units may be realized in one or multiple software programs and/or hardware components.

A person having ordinary skills in the art can appreciate, embodiments of the present disclosure may provide a methods, a system, or a computer program product. As such, the present disclosure may include pure hardware embodiments, pure software embodiments, or a combination of both software and hardware embodiments. In addition, the present disclosure may be in a form of a computer program product implemented in one or more computer-readable storage media (including but not limited to a magnetic storage device, a CD-ROM, an optical storage device, etc.) that stores computer-executable program codes or instructions.

The present disclosure is described with reference to the flow charts or schematic diagrams of the method, device (system), and computer program product of the embodiments of the present disclosure. A person having ordinary skills in the art can appreciate, computer program codes or instructions may be used to implement each step and/or each block of the flow charts and/or the schematic diagram, and a combination of the steps and/or blocks in the flow charts and/or the schematic diagrams. The computer program codes or instructions may be provided to a generic computer, a dedicated computer, an embedded processor, or other processors that may be programmable to process data, to form a machine, or a device that can perform various functions of a step or multiple steps in the flow charts, and/or a block or multiple blocks of the schematic diagrams, based on codes or instructions executed by the computer or other processors that are programmable to process data.

Furthermore, the computer program codes may be stored in a computer-readable storage device that may guide a computer or other device that is programmable to process data to function in a specific manner, such that the codes stored in the computer-readable storage device generates a product including a code device. The code device may realize a specific function of a step or multiple steps of a flow chart, and/or a block or multiple blocks of a schematic diagram.

These computer program codes may be loaded into a computer or other device programmable to process data, such that a series of operation steps are executed on the computer or the other device programmable to process data to perform processing realized by the computer or the other device. The codes executed by the computer or other device programmable may realize specific functions of a step or multiple steps of a flow chart, and/or a block or multiple blocks of a schematic diagram.

A person having ordinary skills in the art can appreciate, embodiments of the present disclosure may provide a method, a system, or a computer program product. Therefore, the present disclosure may be realized by pure hardware embodiments, pure software embodiments, or a combination of software and hardware embodiments. In addition, the present disclosure may be in a form of a computer program product implemented in one or more computer-readable storage media (including but not limited to a magnetic storage device, a CD-ROM, an optical storage device, etc.) that stores computer program codes or instructions.

The above described embodiments are only examples of the present disclosure, and do not limit the scope of the present disclosure. A person having ordinary skills in the art can appreciate that the present disclosure may be modified or varied. Any modification, equivalent substitution, or improvement to the described embodiments within the spirit and principle of the present disclosure, fall within the scope of the claims of the present disclosure.

What is claimed is:

1. A pairing method implemented in a first device, comprising:
    obtaining identification information of a second device, the identification information including a first portion and a second portion;
    generating a system key;
    generating, based on the first portion of the identification information, a pairing request message carrying the system key;
    transmitting the pairing request message to the second device;
    receiving a pairing response message from the second device, the pairing response message including confirmation information;
    analyzing the pairing response message based on the system key to obtain the confirmation information; and
    verifying the confirmation information with the second portion of the identification information to determine a pairing result.

2. The pairing method of claim 1, wherein the identification information comprises pairing identification information, the pairing identification information being first pairing identification information, and the method further comprises:
    receiving a pairing creation message from the second device, the pairing creation message being encrypted based on second pairing identification information; and
    verifying the pairing creation message based on the first pairing identification information.

3. The pairing method of claim 1, wherein the identification information comprises pairing confirmation information, the pairing response message is encrypted based on the system key, and wherein verifying the confirmation information with the second portion of the identification information comprises:
    verifying the confirmation information with the pairing confirmation information to determine the pairing result.

4. The pairing method of claim 3, wherein the analyzed pairing response message comprises the confirmation information.

5. The pairing method of claim 1, wherein the identification information comprises pairing identification information and pairing confirmation information, and wherein the method further comprises:
   analyze a first specified location of the identification information to obtain the pairing identification information, the identification information including a plurality of bits of information, and the first specified location including a first portion of the plurality of bits; and
   analyze a second specified location of the identification information to obtain the pairing confirmation information, the second specified location including a second portion of the plurality of bits.

6. The pairing method of claim 1, wherein the identification information comprises pairing identification information, the pairing identification information comprises a check code, and wherein the method further comprises:
   verifying the pairing identification information based on the check code.

7. The pairing method of claim 1, wherein transmitting the pairing request message to the second device comprises:
   adding first device information to the pairing request message; and
   transmitting the pairing request message to the second device.

8. The pairing method of claim 1, further comprising:
   determining that pairing between the first device and the second device has failed if the pairing response message is not received from the second device within a predetermined time after transmitting the pairing request message to the second device; or
   determining that the pairing between the first device and the second device has failed if it is determined that the pairing response message is invalid in verifying the confirmation information with the second portion of the identification information.

9. The pairing method of claim 1, wherein
   the first device is an unmanned aerial vehicle and the second device is a control device; or
   the first device is the control device and the second device is the unmanned aerial vehicle.

10. A pairing device as a first device, comprising:
    an imaging device configured to capture an image comprising identification information of a second device;
    a processor configured to:
       obtain the identification information of the second device based on the image, the identification information including a first portion and a second portion;
       generate a system key; and
       generate, based on the first portion of the identification information, a pairing request message carrying the system key;
    a transmitter configured to transmit the pairing request message to the second device; and
    a receiver configured to receive a pairing response message from the second device, the pairing response message including confirmation information,
    wherein the processor is configured to analyze the pairing response message based on the system key to obtain the confirmation information and verify the confirmation information with the second portion of the identification information to determine a pairing result.

11. The pairing device of claim 10,
    wherein the identification information comprises pairing identification information,
    wherein the processor is configured to encrypt the pairing request message based on the pairing identification information, and
    wherein the transmitter is configured to transmit the encrypted pairing request message to the second device.

12. The pairing device of claim 10,
    wherein the identification information comprises pairing identification information, the pairing identification information being first pairing identification information,
    wherein the receiver is configured to receive pairing creation information from the second device, the pairing creation information being encrypted based on second pairing identification information, and
    wherein the processor is configured to verify the pairing creation information based on the first pairing identification information.

13. The pairing device of claim 10,
    wherein the identification information comprises pairing confirmation information,
    wherein the pairing response message is encrypted based on the system key,
    wherein in verifying the analyzed pairing response message based on the identification information, the processor is configured to verify the pairing response message based on the pairing confirmation information, and
    wherein the analyzed pairing response message comprises the confirmation information.

14. The pairing device of claim 10,
    wherein the identification information comprises pairing identification information and pairing confirmation information, and
    wherein the processor is configured to analyze a first specified location of the identification information to obtain the pairing identification information, and analyze a second specified location of the identification information to obtain the pairing confirmation information, the identification information including a plurality of bits of information, the first specified location including a first portion of the plurality of bits, and the second specified location including a second portion of the plurality of bits.

* * * * *